US011483536B2

(12) United States Patent
Fleureau et al.

(10) Patent No.: US 11,483,536 B2
(45) Date of Patent: Oct. 25, 2022

(54) METHODS AND APPARATUS FOR VOLUMETRIC VIDEO TRANSPORT

(71) Applicant: InterDigital VC Holdings, Inc., Wilmington, DE (US)

(72) Inventors: Julien Fleureau, Rennes (FR); Renaud Dore, Rennes (FR); Charles Salmon-Legagneur, Rennes (FR); Remi Houdaille, Cesson-Sevigne (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 10 days.

(21) Appl. No.: 17/259,852

(22) PCT Filed: Jun. 21, 2019

(86) PCT No.: PCT/US2019/038407
§ 371 (c)(1),
(2) Date: Jan. 12, 2021

(87) PCT Pub. No.: WO2020/013975
PCT Pub. Date: Jan. 16, 2020

(65) Prior Publication Data
US 2021/0274147 A1 Sep. 2, 2021

(30) Foreign Application Priority Data
Jul. 12, 2018 (EP) .................................... 18305943

(51) Int. Cl.
*H04N 13/194* (2018.01)
*H04N 13/117* (2018.01)
(Continued)

(52) U.S. Cl.
CPC ......... *H04N 13/194* (2018.05); *H04N 13/117* (2018.05); *H04N 13/161* (2018.05); *H04N 21/21805* (2013.01); *H04N 21/816* (2013.01)

(58) Field of Classification Search
CPC .. H04N 13/194; H04N 13/117; H04N 13/161; H04N 21/21805; H04N 21/816; H04N 21/2387; H04N 21/234
(Continued)

(56) References Cited

U.S. PATENT DOCUMENTS

2013/0235152 A1* 9/2013 Hannuksela ......... H04N 19/114
348/43
2018/0035134 A1* 2/2018 Pang .................... H04N 13/156
(Continued)

OTHER PUBLICATIONS

Schwarz et al, "2D Video Coding of Volumetric Video Data", 2018 Picture Coding Symposium (PCS), San Francisco, CA, United States, Jun. 24, 2018, pp. 61-65.
(Continued)

*Primary Examiner* — Thai Q Tran
*Assistant Examiner* — Stephen R Smith
(74) *Attorney, Agent, or Firm* — Volpe Koenig

(57) ABSTRACT

A method and a device provide for transmitting information representing a viewpoint in a 3D scene represented with a set of volumetric video contents; receiving a first volumetric video content of the set, the first volumetric video content being according to a range of points of view comprising the viewpoint, the first volumetric video content being represented with a set of first patches, each of which corresponds to a 2D parametrization of a first group of points in a 3D part of the 3D scene associated with the first volumetric video content, and at least one first patch refers to an area of a second patch corresponding to a 2D parametrization of a second group of points in another 3D part of the 3D scene associated with a second volumetric video content of the set of volumetric video contents.

22 Claims, 7 Drawing Sheets

(51) Int. Cl.
*H04N 13/161* (2018.01)
*H04N 21/218* (2011.01)
*H04N 21/81* (2011.01)

(58) Field of Classification Search
USPC .......................................................... 348/43
See application file for complete search history.

(56) References Cited

U.S. PATENT DOCUMENTS

2018/0359489 A1\* 12/2018 Lakshman ............ H04N 13/111
2019/0139266 A1\* 5/2019 Budagavi ................ G06T 17/00
2020/0084428 A1\* 3/2020 Oh ......................... H04N 19/46

OTHER PUBLICATIONS

Mammou, K. (Ed.), "PCC Test Model Category 2 v0", International Organization for Standardization, ISO/IEC JTC1/SC29/WG11, Coding of Moving Picture and Audio, Document N17248, Macau, China, Oct. 2017, 11 pages.

\* cited by examiner

METHODS AND APPARATUS FOR VOLUMETRIC VIDEO TRANSPORT

This application claims the benefit, under 35 U.S.C. § 371 of International Application PCT/US2019/038407, filed Jun. 21, 2019, which was published in accordance with PCT Article 21(2) on Jan. 16, 2020, in English, and which claims the benefit of European Patent Application No. 18305943.5, filed Jul. 12, 2018.

1. TECHNICAL FIELD

The present document relates to the domain of tree-dimensional (3D) scene and volumetric video content. The present document is also understood in the context of the encoding and/or the formatting of the data representative of the depth of a 3D scene, for example for the rendering of volumetric content on end-user devices such as mobile devices or Head-Mounted Displays.

2. BACKGROUND

This section is intended to introduce the reader to various aspects of art, which may be related to various aspects that are described and/or claimed below. This discussion is believed to be helpful in providing the reader with background information to facilitate a better understanding of the present description. Accordingly, these statements are to be read in this light, and not as admissions of prior art.

Recently there has been a growth of available large field-of-view content (up to 360°). Such content is potentially not fully visible by a user watching the content on immersive display devices such as Head Mounted Displays, smart glasses, PC screens, tablets, smartphones and the like. That means that at a given moment, a user may only be viewing a part of the content. However, a user can typically navigate within the content by various means such as head movement, mouse movement, touch screen, voice and the like. It is typically desirable to encode and decode this content.

Immersive video, also called 360° flat video, allows the user to watch all around himself through rotations of his head around a still point of view. Rotations only allow a 3 Degrees of Freedom (3DoF) experience. Even if 3DoF video is sufficient for a first omnidirectional video experience, for example using a Head-Mounted Display device (HMD), 3DoF video may quickly become frustrating for the viewer who would expect more freedom, for example by experiencing parallax. In addition, 3DoF may also induce dizziness because of a user never only rotates his head but also translates his head in three directions, translations which are not reproduced in 3DoF video experiences.

Volumetric video (also known as 6 Degrees of Freedom (6DoF) video) is an alternative to 3DoF video. When watching a 6DoF video, in addition to rotations, the user can also translate his head, and even his body, within the watched content and experience parallax and even volumes. Such videos considerably increase the feeling of immersion and the perception of the scene depth and prevent from dizziness by providing consistent visual feedback during head translations. The content is created by the means of dedicated sensors allowing the simultaneous recording of color and depth of the scene of interest. The use of rig of color cameras combined with photogrammetry techniques is a common way to perform such a recording.

The amount of data of such volumetric video content is important and requires large storage capacities and high bit-rate is needed to transport such data.

3. SUMMARY

References in the specification to "one embodiment", "an embodiment", "an example embodiment", "a particular embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

According to one embodiment, a method comprising:
receiving an information representative of a viewpoint in a 3D scene, the 3D scene being represented with a set of volumetric video contents;
transmitting a first volumetric video content of the set, the first volumetric video content being according to a range of points of view comprising the viewpoint, the first volumetric video content being represented with a set of first patches, each first patch of the set corresponding to a two-dimensional parametrization of a first group of points comprised into the 3D part of the 3D scene associated with the first volumetric video content, at least a first patch of the set referring to at least an area of at least a second patch corresponding to a two-dimensional parametrization of a second group of points comprised into another 3D part of the 3D scene associated with a second volumetric video content of the set of volumetric video contents.

According to another embodiment, a device configured to:
receive an information representative of a viewpoint in a 3D scene, the 3D scene being represented with a set of volumetric video contents;
transmit a first volumetric video content of the set, the first volumetric video content being according to a range of points of view comprising the viewpoint, the first volumetric video content being represented with a set of first patches, each first patch of the set corresponding to a two-dimensional parametrization of a first group of points comprised into the 3D part of the 3D scene associated with the first volumetric video content, at least a first patch of the set referring to at least an area of at least a second patch corresponding to a two-dimensional parametrization of a second group of points comprised into another 3D part of the 3D scene associated with a second volumetric video content of the set of volumetric video contents.

According to a further embodiment, a method comprising:
transmitting an information representative of a viewpoint in a 3D scene, the 3D scene being represented with a set of volumetric video contents;
receiving a first volumetric video content of the set, the first volumetric video content being according to a range of points of view comprising the viewpoint, the first volumetric video content being represented with a set of first patches, each first patch of the set corresponding to a two-dimensional parametrization of a first group of points comprised into the 3D part of the 3D scene associated with the first volumetric video content, at least a first patch of the set referring to at least an area of at least a second patch corresponding to a two-dimensional parametrization of a second group of points comprised into another 3D part of the 3D scene associated with a second volumetric video content of the set of volumetric video contents.

According to another embodiment, a device configured to:

transmit an information representative of a viewpoint in a 3D scene, the 3D scene being represented with a set of volumetric video contents;

receive a first volumetric video content of the set, the first volumetric video content being according to a range of points of view comprising the viewpoint, the first volumetric video content being represented with a set of first patches, each first patch of the set corresponding to a two-dimensional parametrization of a first group of points comprised into the 3D part of the 3D scene associated with the first volumetric video content, at least a first patch of the set referring to at least an area of at least a second patch corresponding to a two-dimensional parametrization of a second group of points comprised into another 3D part of the 3D scene associated with a second volumetric video content of the set of volumetric video contents.

According to a further embodiment, a computer program product comprises program code instructions to execute the steps of the method(s), when this program is executed on a computer.

According to another embodiment, a (e.g., non-transitory) processor readable medium has stored therein instructions for causing a processor to perform the steps of the method(s).

4. LIST OF FIGURES

The present specification will be better understood, and other specific features and advantages will emerge upon reading the following description, the description making reference to the annexed drawings wherein.

5. DETAILED DESCRIPTION OF EMBODIMENTS

Figure 1:
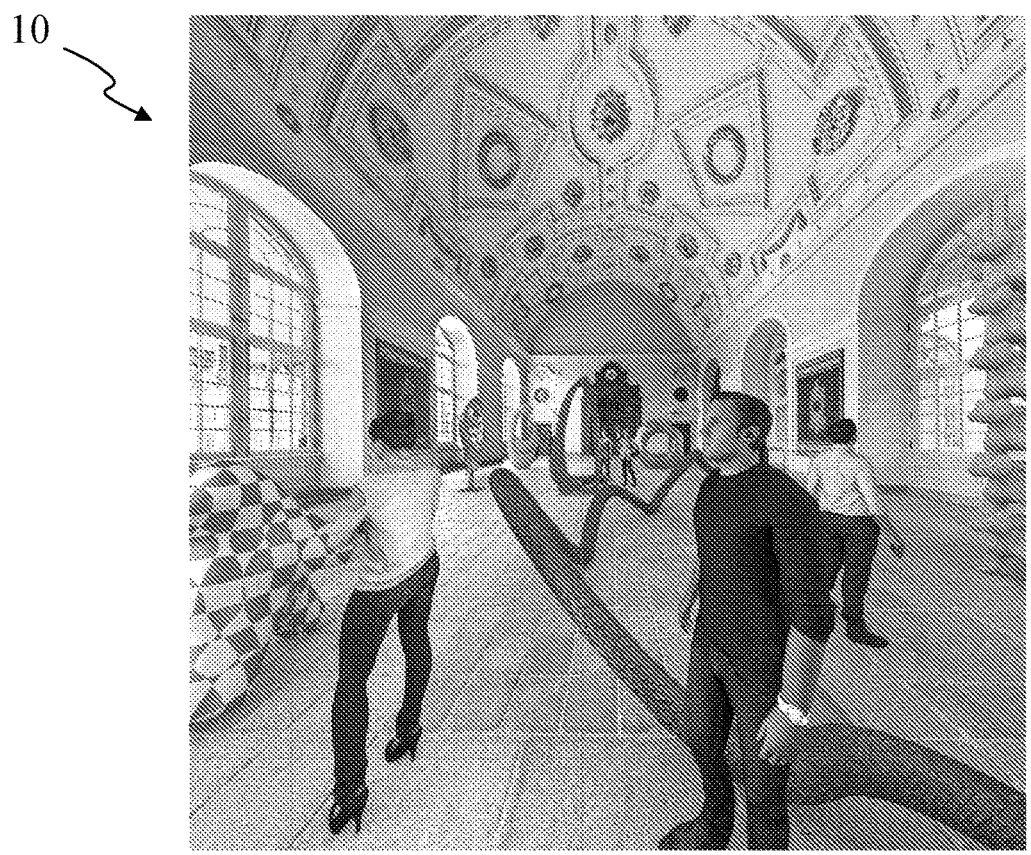
FIG. 1 shows an image representing a three-dimension (3D) scene, according to a non-restrictive embodiment.

The subject matter is now described with reference to the drawings, wherein like reference numerals are used to refer to like elements throughout. In the following description, for purposes of explanation, numerous specific details are set forth in order to provide a thorough understanding of the subject matter. It can be evident, however, that subject matter embodiments can be practiced without these specific details.

According to non-restrictive embodiments, methods and devices to transmit and/or receive data of a volumetric video content are disclosed. It will be appreciated that those skilled in the art will be able to devise various arrangements from the embodiments described hereinbelow.

One or more embodiments of a method for (and an apparatus configured for) transmitting a first volumetric video content of a set of volumetric video contents representing a 3D scene are described. An information representative of a given viewpoint in the 3D scene is received. In response to the reception of the information representative of the given viewpoint, a first volumetric video content is transmitted, the first volumetric content being according to a range of points of view (i.e. the first volumetric video content represents a 3D part of the 3D scene as seen from the range of points of view), the range of points of view comprising the given viewpoint. The first volumetric video content is represented with a set of first patches, each first patch of the set corresponding to a two-dimensional parametrization of a first group of points comprised into the 3D part of the 3D scene associated with the first volumetric video content. At least a first patch of the set refers to at least an area of at least a second patch, which corresponds to a two-dimensional parametrization of a second group of points comprised into another 3D part of the 3D scene associated with a second volumetric video content of the set of volumetric video contents.

One or more embodiments of a method for (and an apparatus configured for) receiving a first volumetric video content of a set of volumetric video contents representing a 3D scene are described. An information representative of a given viewpoint in the 3D scene is transmitted. In response to the transmission of the information representative of the given viewpoint, a first volumetric video content is received, the first volumetric content being according to a range of points of view (i.e. the first volumetric video content represents a 3D part of the 3D scene as seen from the range of points of view), the range of points of view comprising the given viewpoint. The first volumetric video content is represented with a set of first patches, each first patch of the set corresponding to a two-dimensional parametrization of a first group of points comprised into the 3D part of the 3D scene associated with the first volumetric video content. At least a first patch of the set refers to at least an area of at least a second patch, which corresponds to a two-dimensional parametrization of a second group of points comprised into another 3D part of the 3D scene associated with a second volumetric video content of the set of volumetric video contents.

FIG. 1 shows an image representing a three-dimensional (3D) scene 10 comprising a surface representation of several objects. The scene may have been acquired using any suitable technology. For example, it may have been created using computer graphics interface (CGI) tools. It may have been acquired with color and depth image acquisition devices. In such a case, it is possible that one or more parts of the objects that are not visible from the acquisition devices (e.g. cameras) may not be represented in the scene as described in relation to FIG. 1. The data associated with elements (e.g. points) of the 3D scene is acquired, the data corresponding to attributes associated with the elements of the scene, i.e. texture (color) attributes and/or geometry attributes. For example, a sequence of temporally successive images may be acquired. The texture attributes may be acquired with one or more photosensors and the geometry attributes may for example be acquired with one or more depth sensors. According to a variant, the 3D scene is obtained with CGI (Computer-generated imagery) technology. At least a part of the 3D scene is visible according to a plurality of points of view, for example according to a range of points of view including a first central viewpoint. According to a variant, the 3D scene is neither acquired nor generated via CGI but retrieved from the cloud, a library of volumetric contents or any storage unit or apparatus. The example scene illustrated in FIG. 1 comprises characters and objects in a room. The 3D scene 10 is represented according to a determined point of view in FIG. 1. This point of view may for example be part of a space of view from which a user may observe the 3D scene. According to a variant, the content of the 3D scene (depth and/or texture information) that is available corresponds only to the elements of the scene (e.g. points) that are visible from the determined point of view of FIG. 1.

Figure 2:
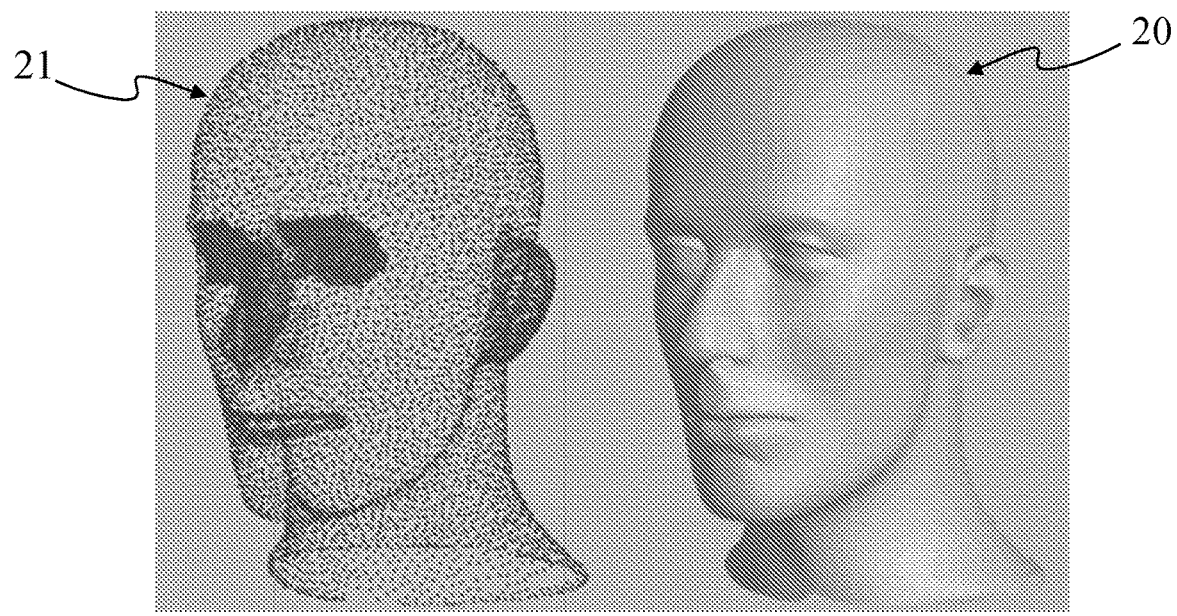
FIG. 2 shows a three-dimension (3D) model of an object of the 3D scene of FIG. 1 and points of a point cloud corresponding to the 3D model, according to a non-restrictive embodiment.

FIG. 2 shows a three-dimension (3D) model of an object 20 and points of a point cloud 21 corresponding to the 3D model 20. The 3D model 20 and the point cloud 21 may for example correspond to a possible 3D representation of an object of the 3D scene 10, for example the head of a character. The model 20 may be a 3D mesh representation and points of point cloud 21 may be the vertices of the mesh. Points of the point cloud 21 may also be points spread on the surface of faces of the mesh. The model 20 may also be represented as a splatted version of the point cloud 21, the surface of the model 20 being created by splatting the points of the point cloud 21. The model 20 may be represented by a lot of different representations such as voxels or splines. FIG. 2 illustrates the fact that a point cloud may be defined with a surface representation of a 3D object and that a surface representation of a 3D object may be generated from a point of cloud. As used herein, projecting points of a 3D object (by extension points of a 3D scene) onto an image is equivalent to projecting any image representation of this 3D object to create an object.

A point cloud may be seen as a vector-based structure, wherein each point has its coordinates (e.g. three-dimensional coordinates XYZ, or a depth/distance from a given viewpoint) and one or more attributes, also called component. An example of component is the color component that may be expressed in various color spaces, for example RGB (Red, Green and Blue) or YUV (Y being the luma component and UV two chrominance components). The point cloud is a representation of the object as seen from a given viewpoint, or a range of viewpoints. The point cloud may be obtained by many ways, e.g.:

from a capture of a real object shot by a rig of cameras, optionally complemented by depth active sensing device;

from a capture of a virtual/synthetic object shot by a rig of virtual cameras in a modelling tool;

from a mix of both real and virtual objects.

The volumetric parts of the 3D scene may for example be represented with one or several point clouds such as the point cloud 21.

Figure 3:
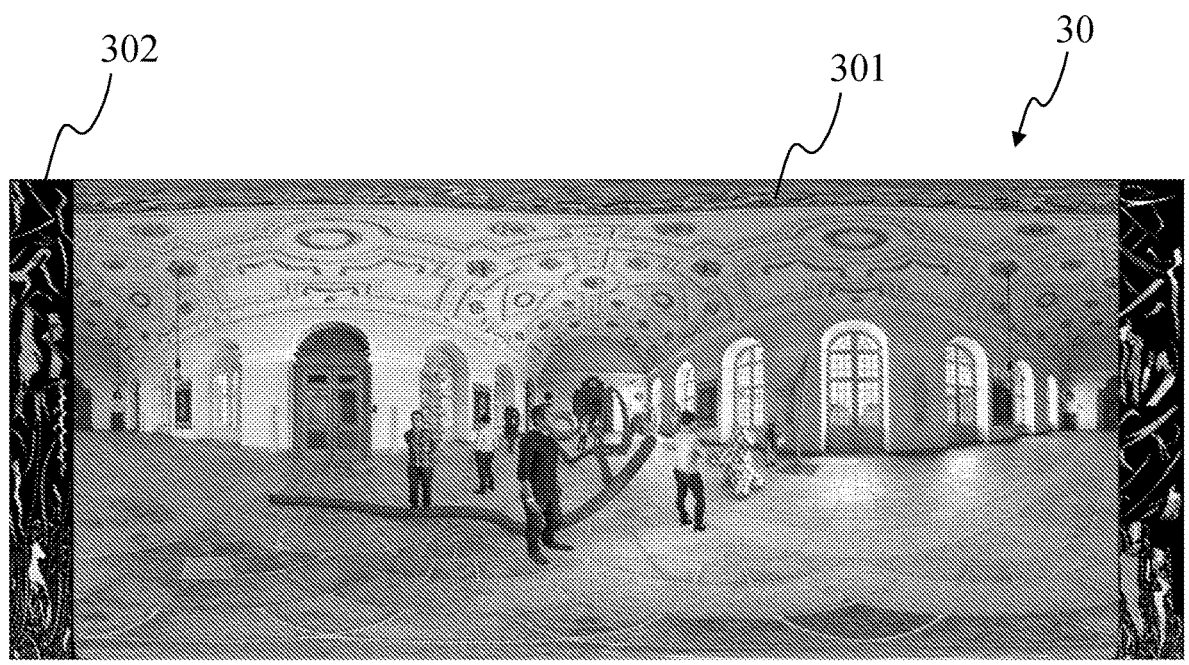
FIG. 3 shows a picture comprising texture information of the points of the 3D scene of FIG. 1, according to a non-restrictive embodiment.

FIG. 3 shows an example of a picture 30 comprising the texture information (e.g. RGB data or YUV data) of the points of a part of the 3D scene 10, for example a part of the 3D scene as seen from a space of view (corresponding to a range of continuous points of view), according to a non-limiting embodiment.

The picture 30 comprises a first part 301 comprising the texture information of the elements (points) of the part of the 3D scene that are visible from a first viewpoint and one or more second parts 302. The texture information of the first part 301 may for example be obtained according to an equirectangular projection mapping, an equirectangular projection mapping being an example of spherical projection mapping and an example of a two-dimensional (2D) parametrization of the part of the 3D scene. In the example of FIG. 3, the second parts are arranged at the left and right borders of the first part 301 but the second parts may be arranged differently. The second parts 302 comprise texture information of parts of the 3D scene that are complementary to the part visible from the first viewpoint (which may correspond to parts of the 3D scene visible according to other points of view of the space of view but the first viewpoint). The second parts may be obtained by removing from the 3D scene the points that are visible from the first viewpoint (the texture of which being stored in the first part) and by projecting the remaining points according to the same first viewpoint. The latter process may be reiterated iteratively to obtain at each time the hidden parts of the 3D scene. According to a variant, the second parts may be obtained by removing from the 3D scene the points that are visible from the first viewpoint (the texture of which being stored in the first part) and by projecting the remaining points according to a viewpoint different from the first viewpoint, for example from one or more second viewpoints of a space of view centered onto the first viewpoint. Each second part may be seen as a patch obtained by 2D parametrization of the part of the scene corresponding to said second part.

The first part 301 may be seen as a first large texture patch (corresponding to a first part of the 3D scene) and the second parts 302 as comprising a set of smaller textures patches (corresponding to second parts of the 3D scene that are complementary to the first part).

The picture 30 may correspond to the texture information/data of a volumetric video content associated with the part of the 3D scene 10 seen from the space of view. The space of view, which may correspond to a range of continuous points of view (e.g. centered around the first viewpoint) is associated with this volumetric video content.

Figure 4:
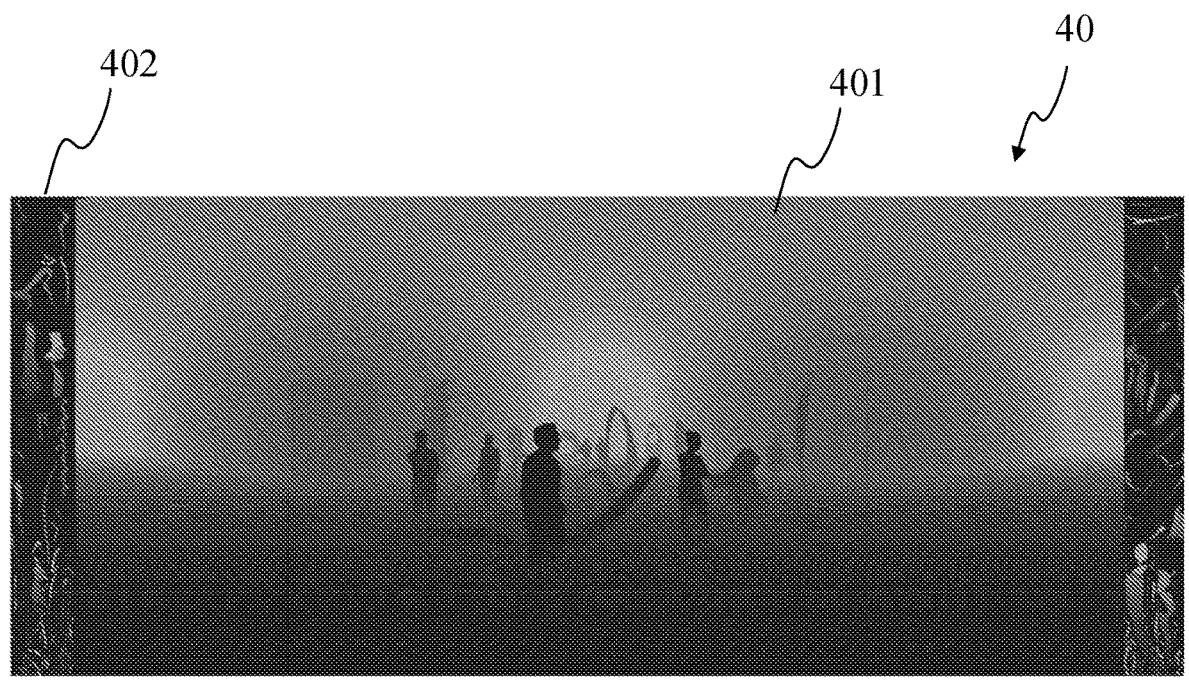
FIG. 4 shows a picture comprising depth information of the points of the 3D scene of FIG. 1, according to a non-restrictive embodiment.

FIG. 4 shows an example of a picture 40 comprising the depth information of the points of the part of the 3D scene 10, according to a non-limiting embodiment. The picture 40 may be seen as the depth picture corresponding to the texture picture 30.

The picture 40 comprises a first part 401 comprising the depth information of the elements (points) of the 3D scene that are visible from the first viewpoint and one or more second parts 402. The picture 40 may be obtained in a same way as the picture 30 but contains the depth information associated with the points of the 3D scene instead of the texture information as in the picture 30.

The first part 401 may be seen as a first large depth patch (corresponding to a first part of the 3D scene) and the second parts 402 comprises smaller textures patches (corresponding to second parts of the 3D scene that are complementary to the first part).

For 3DoF rendering of the part of the 3D scene, only one point of view, for example the first viewpoint, is considered. The user may rotate his head in three degrees of freedom around the first point of view to watch various parts of the 3D scene, but the user cannot move the first viewpoint. Points of the scene to be encoded are points which are visible from this first viewpoint, and only the texture information is needed to be encoded/decoded for the 3DoF rendering. There is no need to encode points of the scene that are not visible from this first viewpoint as the user cannot access to them by moving the first viewpoint.

With regard to 3DoF+ rendering, the user may move the point of view within a limited space around a point of view, for example around the first viewpoint, the limited space around the point of view corresponding to the space of view associated with the pictures 30 and 40. For example, the user may move his point of view within a determined space of view centered on the first viewpoint. This enables to experience parallax. Data representative of the part of the scene visible from any point of the space of view is to be encoded into the stream, including the data representative of the 3D scene visible according to the first viewpoint (i.e. the first parts 301 and 401). The size and shape of the space of view may for example be decided and determined at the encoding step and encoded in the bitstream. The decoder may obtain this information from the bitstream and the renderer limits the space of view to the space determined by the obtained information. According to another example, the renderer determines the space of view according to hardware constraints, for example in relation to capabilities of the sensor(s) that detects the movements of the user. In such a case, if, at the encoding phase, a point visible from a point within the space of view of the renderer has not been encoded in the bitstream, this point will not be rendered. According to a further example, data (e.g. texture and/or geometry) representative of every point of the 3D scene is encoded in the stream without considering the rendering space of view. To optimize the size of the stream, only a subset of the points of the scene may be encoded, for instance the subset of points that may be seen according to a rendering space of view.

With regard to 6DoF rendering, the user may move the viewpoint everywhere in the scene (i.e. according to the 3 rotations (around yaw, pitch and roll axis) and 3 translations (along the yaw, pitch and roll axis)). For 6DoF rendering, every point (depth and texture) of the scene must be encoded in the bitstream as every point is potentially accessible by a user who can move his/her point of view. At the encoding stage, there is no means to know, a priori, from which viewpoint the user will observe the 3D scene 10.

Figure 5:
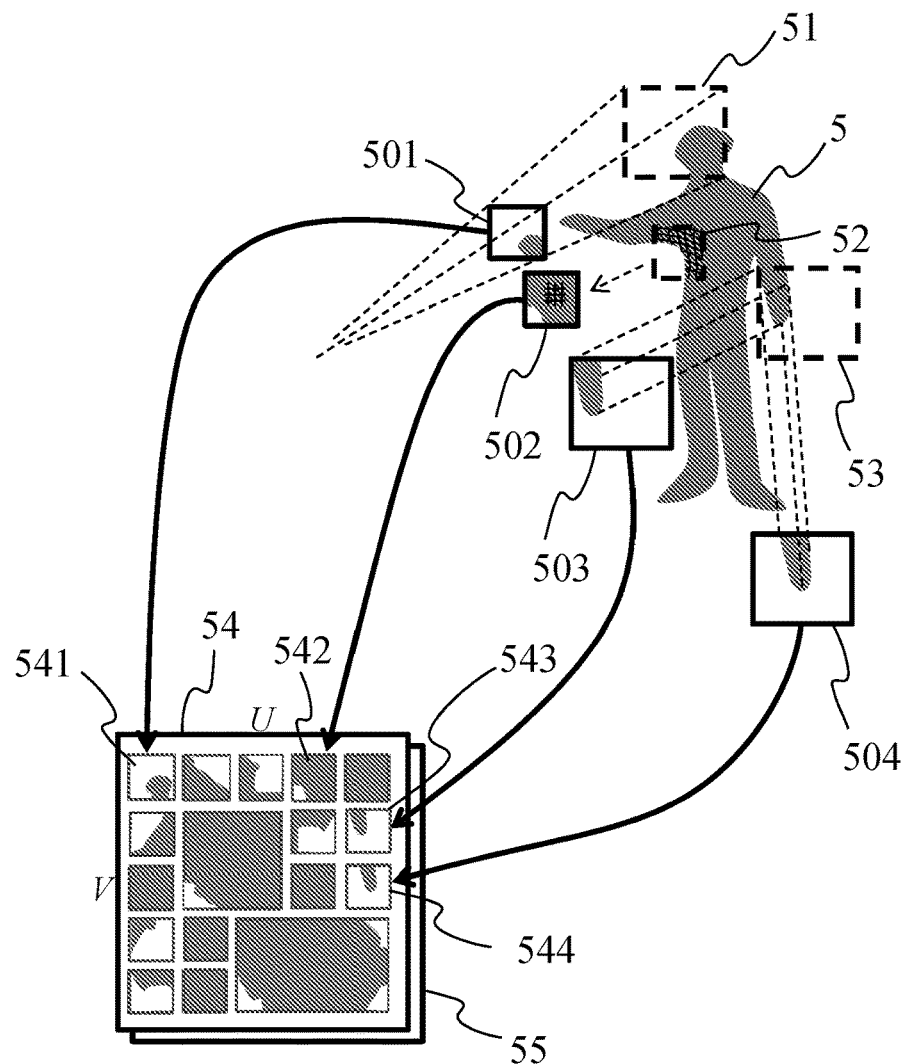
FIG. 5 shows the 2D parametrization of at least a part of the 3D scene of FIG. 1, according to a non-restrictive embodiment.

FIG. 5 shows the obtaining of patches of a part of the 3D scene (e.g. one of the character of the 3D scene 10) that may be packed on one or more patch atlas 54, 55, or on the pictures 30 and 40, according to a non-limiting embodiment. The part of the 3D scene is seen from a given space of view. The point cloud representing the 3D object 5 is partitioned into a plurality of 3D parts, e.g. 5, 10, 50, 100, 1000 or more 3D parts, 3 of them being illustrated on FIG. 5, i.e. the 3D parts 52, 53 and 54, the 3D part 54 comprising points of the point cloud representing part of the head of the person, the 3D part 52 comprising points of the point cloud representing an armpit of the person and the 3D part 53 comprising points of the point cloud representing a hand of the person. One or more patches of each 3D part or of a part of the 3D parts are generated to represent each 3D part in two dimensions, i.e. according to a 2D parametrization. For example, a 2D parametrization 501 is obtained for the 3D part 51, a 2D parametrization 502 is obtained for the 3D part 52 and 2 different 2D parametrizations 503 and 504 may be obtained for the 3D part 53. The 2D parametrization may vary from a 3D part to another one. For example, the 2D parametrization 501 associated with the 3D part 51 is a linear perspective projection while the 2D parametrization 502 associated with the 3D part 52 is a LLE and the 2D parametrizations 503 and 504 associated with the 3D part 53 are both orthographic projections according to different points of view. According to a variant, all 2D parametrizations associated with all 3D parts are of the same type, e.g. a linear perspective projection or an orthographic projection. According to a variant, different 2D parametrizations may be used for a same 3D part.

A 2D parametrization associated with one given 3D part of the point cloud corresponds to a browsing in 2 dimensions of the given 3D part of the point cloud allowing to sample the given 3D part, i.e. a 2D representation of the content (i.e. the point(s)) of this given 3D part comprising a plurality of samples (that may correspond to the pixels of a first image), the number of which depending from the sampling step that is applied. A 2D parametrization may be obtained in diverse ways, for example by implementing any one of the following methods:

linear perspective projection of the points of the 3D part of the point cloud onto a plane associated with a point of view, the parameters representative of the linear perspective projection comprising the location of the virtual camera, the spatial sampling step and the field of view in the 2 dimensions;

orthographic projection of the points of the 3D part of the point cloud onto a surface, the parameters representative of the orthographic projection comprising the geometry (shape, size and orientation) of the projecting surface and spatial sampling step;

LLE (Locally-Linear Embedding) that corresponds to a mathematical operation of dimension reduction, here applied to convert/transform from 3D to 2D, the parameters representative of the LLE comprising the transformation coefficients.

Each patch has advantageously a rectangular shape to ease the packing process on the patch atlas 54, 55. The patch atlas 54 may be a geometry patch atlas, i.e. a picture of pixels comprising the different patches 541, 542, 543 and 544 (that may be seen as arrays of pixels for example), geometry information obtained by projection/2D parametrization of the points of the associated 3D part being associated with each pixel. Geometry information may correspond to depth information or information on the position of the vertices of a mesh element. A corresponding texture patch atlas 55 comprising the texture information associated with the 3D parts may be obtained in a same way.

Mapping information that links each 2D parametrization with its associated patch in the geometry patch atlas and in the texture patch atlas may be generated. The mapping information may be generated to keep the connection between a 2D parametrization and the associated geometry patch and texture patch in respectively the geometry patch atlas and the texture patch atlas. The mapping information may for example be of the form of:

{parameters of the 2D parametrization; geometry patch ID; texture patch ID} wherein the geometry patch ID may be an integer value or a pair of values comprising the column index U and the row index V the geometry patch belongs to in the matrix of patches of the geometry patch atlas; the texture patch ID may be an integer value or a pair of values comprising the column index U' and the row index V' the texture patch belongs to in the matrix of patches of the texture patch atlas.

When the geometry patches and the texture patches are arranged according to a same arrangement in the geometry patch atlas and the texture patch atlas, the geometry patch ID and the texture patch ID are the same and the mapping information may be for example of the form of:

{parameters of the 2D parametrization; geometry and texture patch ID} wherein 'geometry and texture patch ID' identifies both geometry patch in the geometry patch atlas and the texture patch in the texture patch atlas, either via a same integer value associated with both geometry patch and texture patch or via the pair of values column index U and row index V the geometry patch and texture patches belong in respectively the geometry patch atlas and the texture patch atlas.

The same mapping information is generated for each 2D parametrization and associated geometry patch and texture patch. Such a mapping information enables to reconstruct the corresponding parts of the 3D scene by establishing the association of the 2D parametrization with corresponding geometry patch and texture patch. If the 2D parametrization is a projection, the corresponding part of the 3D scene may be reconstructed by de-projecting (performing the inverse projection) the geometry information comprised in the associated geometry patch and the texture information in the associated texture patch. The mapping information then corresponds to a list of mapping information:

{parameters of the 2D parametrization; geometry and texture patch ID}$_i$,

For i=1 to n, with n the number of 2D parametrizations.

Information comprised in the patch atlas 54, 55 enables a 3DoF+ rendering of the 3D part of the scene as seen from the given space of view associated with the part of the 3D scene, i.e. a user watching at the part of the 3D scene rendered from the patch atlas may browse into the scene according to the various viewpoints comprised in the space of view.

Figure 7:
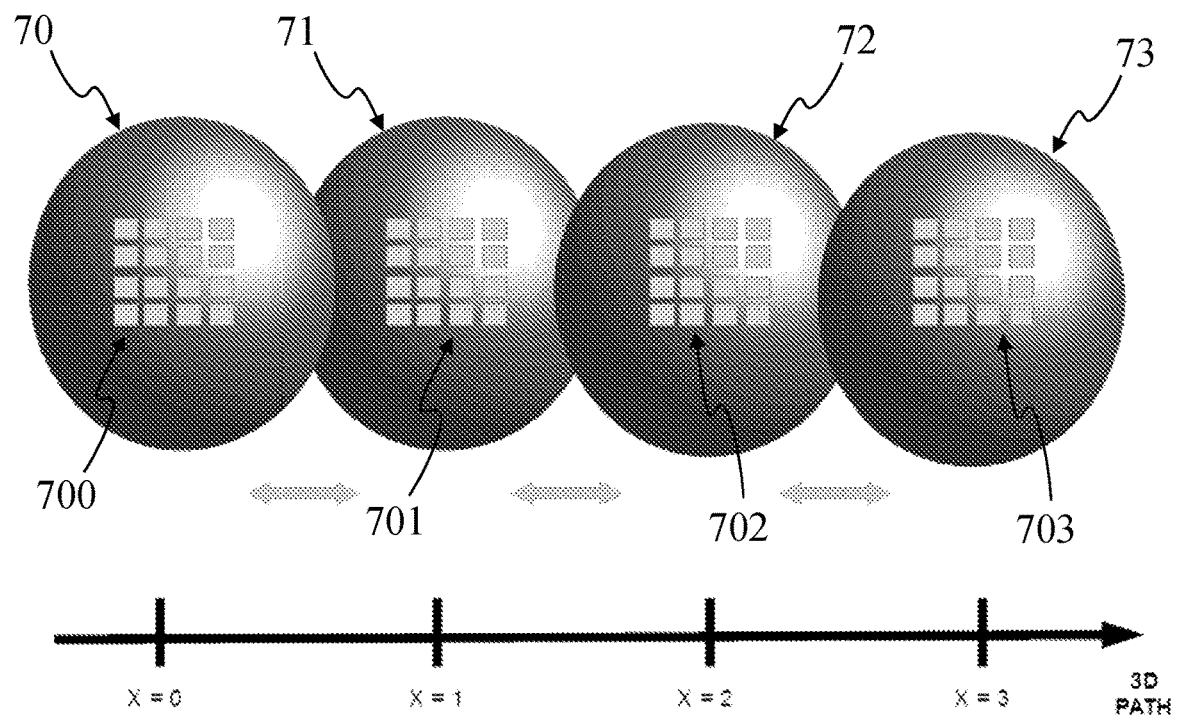
FIGS. 7 and 8 show the storing and streaming of volumetric video content corresponding to the 3D scene of FIG. 1 for 6DoF rendering of the volumetric content, according to a non-restrictive embodiment.

FIG. 7 shows a set of volumetric video contents 70, 71, 72 and 73, according to a non-limiting embodiment.

Each volumetric video content 70 to 73 represents a 3D part of the 3D scene according to a given range of points of view, each volumetric video content 70 to 73 enabling a 3DoF+ rendering of the part of the 3D scene represented with said each volumetric video content. The set of volumetric video contents 70 to 73 enables for example a complete representation of the 3D scene and enables a user to browse into the whole 3D scene. According to a variant, only a part of the 3D scene is represented with the set of volumetric video contents. For example, a 3D path may be determined within the scene and the set of volumetric video contents enables a user to browse into the 3D scene along this 3D path.

The 3D space of the 3D scene may be sampled into a plurality of determined viewpoints (for example the viewpoints X=0, X=1, X=2 and X=3 of the 3D path illustrated on FIG. 7) and a volumetric video content is generated from each of the determined viewpoints to obtain a full representation of the 3D scene. A space of view or range of points of view is associated with each volumetric video content, the space of view of a given volumetric video content being for example centered around the viewpoint from which the volumetric video content is generated. There is an overlapping in the content between two neighbour volumetric video content to ensure a smooth browsing to an end-user. For example, the volumetric video contents 70 and 71 may partly overlap, the volumetric video contents 71 and 72 may partly overlap and the volumetric video contents 72 and 73 may partly overlap. An overlapping in the content of two volumetric video contents means that some viewpoints comprised in the spaces of view associated with the two neighbour volumetric video contents are common to the two spaces of view.

Each volumetric video content 70 to 73 is represented with a set of patches 700, 701, 702 and 703, which comprises texture and geometry information. The set of patches may be arranged within pictures or patch atlas as described in relation to FIGS. 3, 4 and/or 5.

Figure 8:
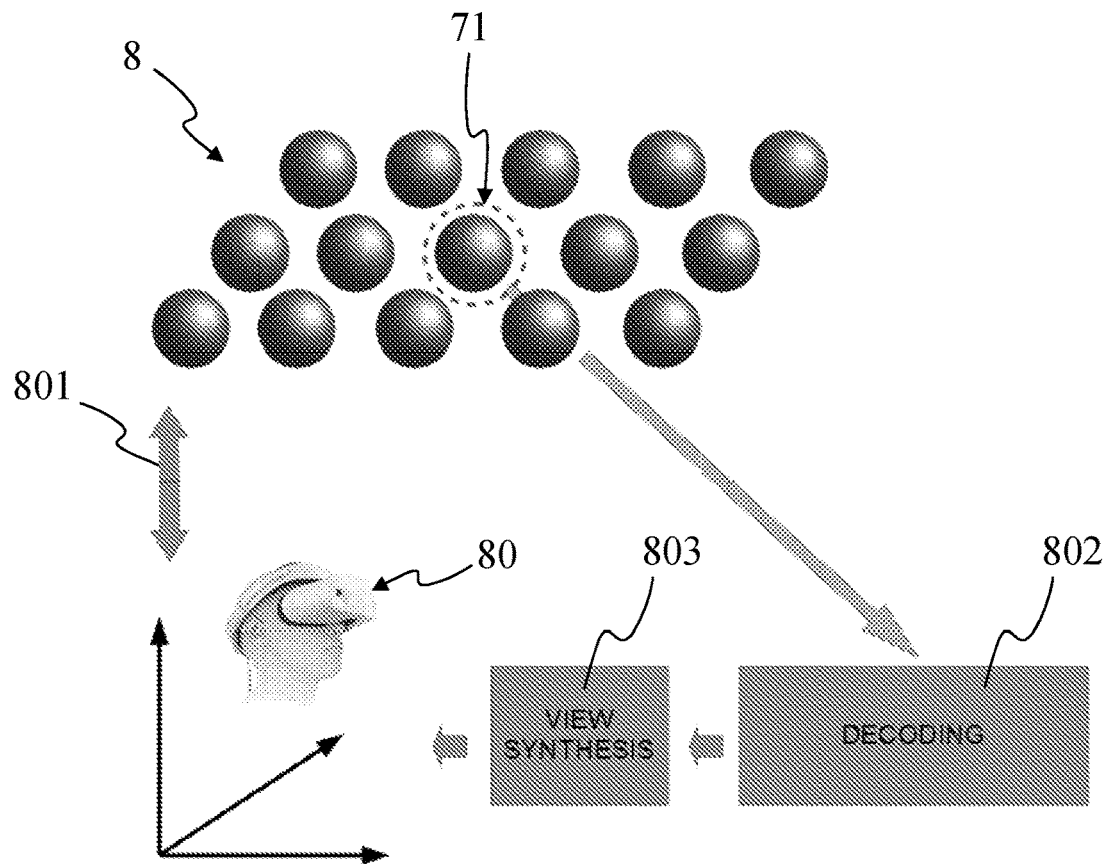

FIG. 8 shows a process for 6DoF rendering of the 3D scene or part of it from the set 18 of volumetric video contents of FIG. 7, according to a non-restrictive embodiment.

According to the embodiment of FIG. 8, an end-user is wearing an immersive rendering device 80 (e.g. an HMD) to browse into the video representation of the 3D scene. The position of the end-user is determined within the 3D scene (i.e. in the space of the 3D scene), for example using the IMU (Inertial Measurement Unit) of the HMD. The HMD may comprise one or more display screens (for example LCD (Liquid Crystal Display), OLED (Organic Light-Emitting Diode) or LCOS (Liquid Crystal On Silicon)) and sensor(s) configured for measuring the change(s) of position of the HMD, for example gyroscopes or an IMU (Inertial Measurement Unit), according to one, two or three axes of the real world (pitch, yaw and/or roll axis). The part of the volumetric content corresponding to the measured position of the HMD may be determined with a specific function establishing the relationship between the viewpoint associated with the HMD in the real world and the viewpoint of a virtual camera associated with the volumetric content. Controlling the part of the volumetric content to be displayed on the display screen(s) of the HMD according to the measured position of the HMD enables a user wearing the HMD to browse into the volumetric content (and the 3D scene), which is larger than the field of view associated with the display screen(s) of the HMD. According to a variant, the immersive rendering device 80 is a tablet with a tactile display screen, the user browsing into the content by scrolling the content with one or more fingers sliding onto the tactile display screen. According to another variant, the immersive rendering unit 80 is a control unit associated with a display device such as an HMD or a tablet.

An information representative of the current viewpoint of the end-user is transmitted, for example to a server or a remote storage device. The information representative of the viewpoint corresponds for example to the location of the immersive rendering device in the real world or the viewpoint of the immersive rendering device in the space of the 3D scene.

Based on the received information representative of the current viewpoint, a volumetric video content 71 is selected among the set 8 of the volumetric video contents 70 to 73 stored on the server or remote storage device. The volumetric video content 71 is selected by for example comparing the received current viewpoint with the spaces of view (or ranges of points of view) associated with each volumetric video content of the set 8. The received current viewpoint may for example be compared with a reference viewpoint (e.g. the central viewpoint) of each of the spaces of view of the volumetric video contents and the reference viewpoint that is spatially the closest from the received current viewpoint is selected, with the corresponding volumetric video content (e.g. the volumetric video content 71 and associated reference viewpoint X=1 according to the embodiment of FIGS. 7 and 8).

The selected volumetric video content 71 is transmitted to the immersive rendering device 80. The data (texture and geometry) representative of the volumetric video content 71 is for example encoded under the form of a set of patches 701 arranged in pictures of patch atlas. The data transmitted and received by the immersive rendering device is decoded by a decoder 802. A view of the 3D scene corresponding to the current viewpoint is synthesized, for example by a synthesizer 803, from the decoded data (by deprojecting the patches) and rendered in the end-user viewport. The synthesized view is then transmitted to the display screen of the immersive rendering device (or to the display screen connected to the immersive rendering device) for display.

When a change of viewpoint of the end-user occurs, an information representative of the new viewpoint is transmitted, and a corresponding volumetric video content is selected (for example the volumetric video content 70). The set of patches 700 used to represent the volumetric video content 70 is transmitted to the immersive rendering device for decoding 802, view synthesis 803 and displaying.

The rendering of a given volumetric video content received from the server by the immersive rendering device corresponds to a 3DoF+ rendering of the part of the scene associated with the given volumetric video content. The consecutive rendering of several volumetric video contents of the set 8 enables a 6DoF rendering of the 3D scene (or part of it) while limiting the bitrate that is needed to stream the data representative of the volumetric video content for 6DoF rendering (only one volumetric video content representing a part of the 3D scene needs to be streamed at a time and not the whole 3D scene).

Figure 9:
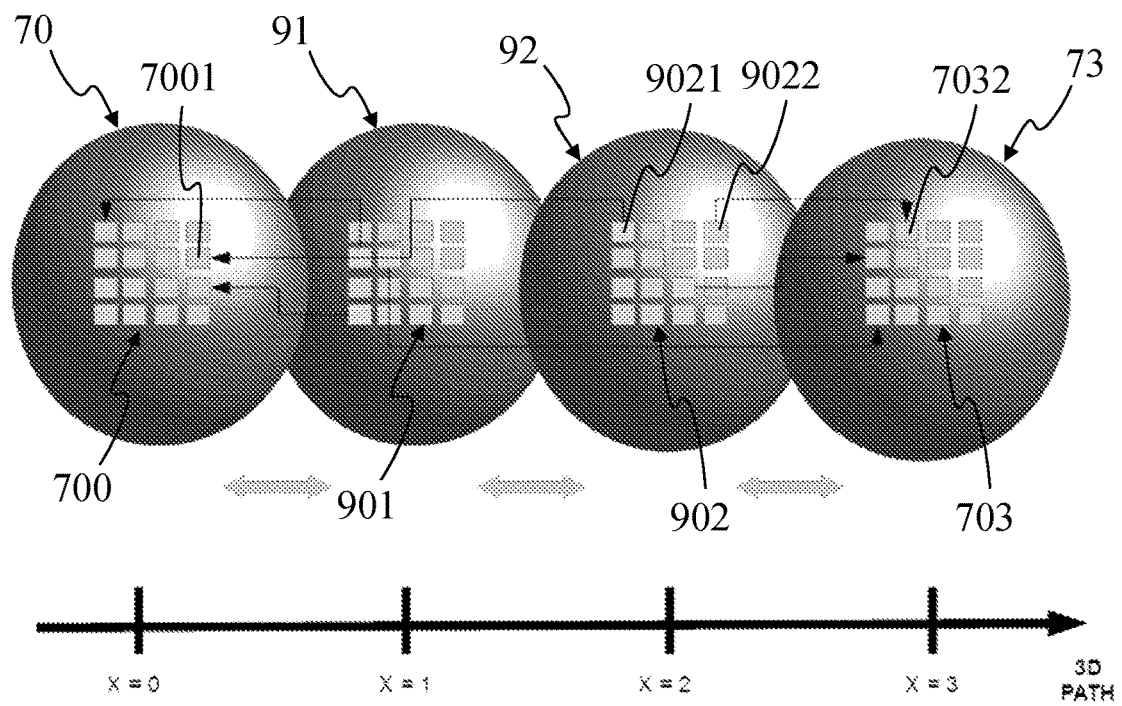
FIGS. 9 and 10 show a further non-limiting embodiment of the storing and streaming of volumetric content corresponding to the 3D scene of FIG. 1 for 6DoF rendering of the volumetric content.

FIG. 9 shows a set of volumetric video contents 70, 91, 92 and 73, according to a further non-limiting embodiment.

Each volumetric video content 70, 91, 92 and 73 represents a 3D part of the 3D scene according to a given range of points of view, each volumetric video content 70, 91, 92 and 73 enabling a 3DoF+ rendering of the part of the 3D scene represented with said each volumetric video content 70, 91, 92 and 73. The set of volumetric video contents 70, 91, 92 and 73 enables for example a complete representation of the 3D scene and enables a user to browse into the whole 3D scene. According to a variant, only a part of the 3D scene is represented with the set of volumetric video contents. For example, a 3D path may be determined within the scene and the set of volumetric video contents enables a user to browse into the 3D scene along this 3D path.

The 3D space of the 3D scene may be sampled into a plurality of determined viewpoints (for example the viewpoints X=0, X=1, X=2 and X=3 of the 3D path illustrated on FIG. 9) and a volumetric video content is generated from each of the determined viewpoints to obtain a full representation of the 3D scene. A space of view or range of points of view is associated with each volumetric video content 70, 91, 92 and 73, the space of view of a given volumetric video content being for example centered around the viewpoint (X=0, X=1, X=2 and X=3) from which the volumetric video content is generated. There is an overlapping in the content between two neighbour volumetric video content to ensure a smooth browsing to an end-user. For example, the volumetric video contents 70 and 91 may partly overlap, the volumetric video contents 91 and 92 may partly overlap and the volumetric video contents 92 and 73 may partly overlap. An overlapping in the content of two volumetric video contents means that some viewpoints comprised in the spaces of view associated with the two neighbour volumetric video contents are common to the two spaces of view.

Each volumetric video content 70, 91, 92 and 73 is represented with a set of patches, which comprises texture and geometry information. The set of patches may be arranged within pictures or patch atlas as described in relation to FIGS. 3, 4 and/or 5.

To reduce the memory requirements for storing the various volumetric video contents 70, 91, 92 and 73, the patches of a set of a given volumetric video content are compared with patches of other volumetric video contents, for example the patches of the set 901 are compared with the patches of the sets 700, 902 and 703 of respectively the volumetric video contents 70, 92 and 73 to detect content redundancy between patches. Indeed, as the volumetric video contents 70, 91, 92 and 73 partly overlap, some patches of said volumetric video contents may have a same content, at least in part. According to a variant, the patches of the set 901 are compared with only a part of the other volumetric video contents, for example with only the sets 700 and 703 of respectively the volumetric video contents 70 and 73. According to this variant, some of the volumetric video contents may be determined as references, i.e. patches of other volumetric video content may refer to patches of the reference volumetric video contents but the patches of the reference volumetric video content do not refer to any patches of other volumetric video contents. According to the specific embodiment of FIG. 9, the volumetric video contents 70 and 73 may be considered as being reference volumetric video content while the other volumetric video contents 91 and 92 are not (the volumetric video contents 91 and 92 each comprises at least a patch that refers to one or more patches of the reference volumetric video contents 70 and 73).

To reduce the memory footprint, patches that have been identified as comprising a content (texture and/or geometry) that is identical to a patch of another volumetric video content do not contain the texture and/or geometry information but merely an information identifying the other patch that comprises the same content (texture and/or geometry). For example, the patch 9021 of the set 902 has been identified as comprising the same content as the patch 7001 of the set 700. The patch 9022 of the set 902 has been identified as comprising the same content as the patch 7032 of the set 703. The patch 9021 comprises an information identifying the patch 7001 to which it refers to (instead of the data representative of the attributes, texture or geometry, of the part of the 3D scene it represents), such an information being coded with a few bits only while coding the data representative of the attributes would require a much greater number of bits. In a same way, the patch 9022 comprises an information identifying the patch 7032 to which it refers to.

According to a variant embodiment, the patch 9021 and/or 9022 may refer to only an area (sub-part) of the patch 7001 and/or 7032, respectively, when only said area of the patch 7001 and/or 7032 comprises the content of the patch 9021 and/or 9022. According to this variant embodiment, the patch 9021 comprises an information identifying the patch 7001 it refers to with an information identifying the specific area of the patch 7001 that comprises the same content as the patch 9021. The specific area may for example be identified with the coordinates of a reference pixel within the patch 7001 (e.g. row and column numbers) with a height and a width (for example each expressed with a number of pixels).

According to a further embodiment, a patch referring to another patch does not comprise the information identifying the patch it refers it. According to this further embodiment, a list establishing the mapping between the patches is associated with each volumetric video content, said list further comprising an information indicating whether a patch refers to another patch (for example with a 1-bit flag, the flag taking the value '0' when the patch does not refer to another one and the value '1' when the patch does refer to another patch, or inversely). The list may for example take the form of a LUT (Look-Up-table), for example:

TABLE 1 mapping list

| Patch ID | Reference (Yes/No) | Referee patch ID |
|---|---|---|
| 0000 | 0 | |
| 0001 | 1 | XXXXXXX |
| 0002 | 0 | |
| 0003 | 0 | |
| ... | | |
| 0111 | 1 | YYYYYYY |

Figure 10:
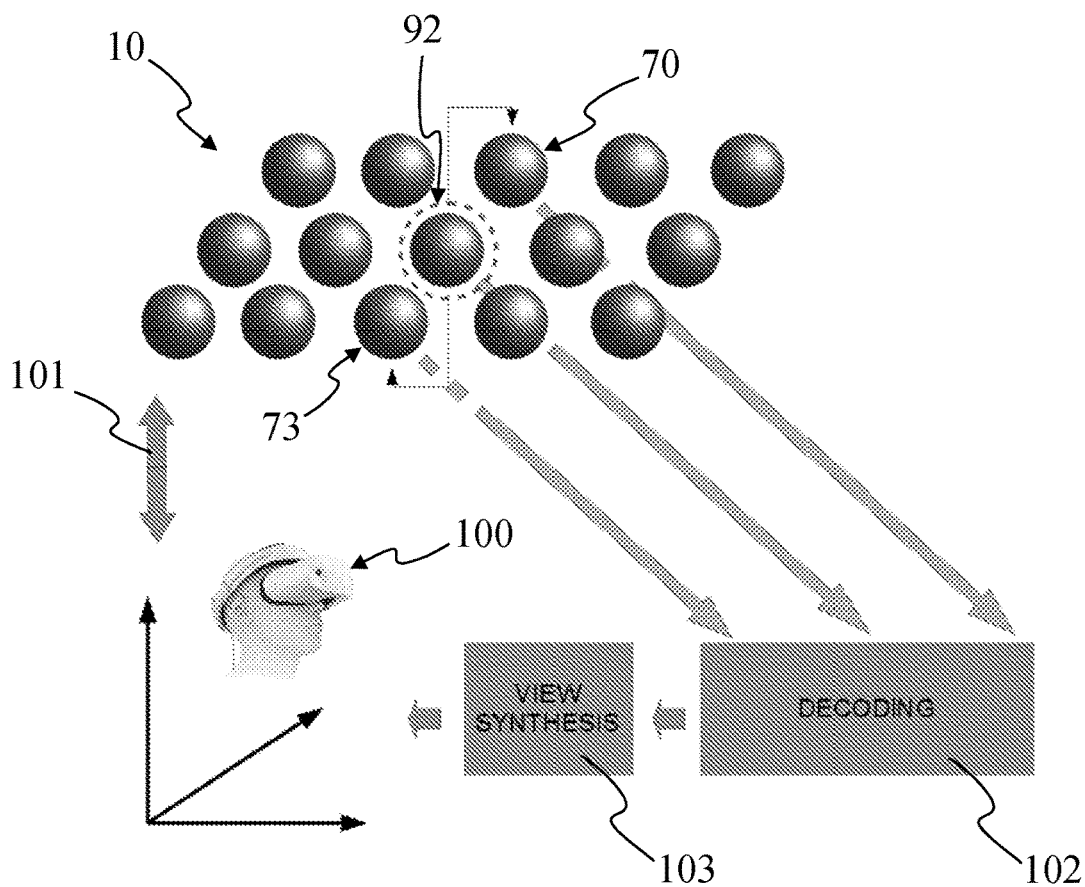

FIG. 10 shows a process for 6DoF rendering of the 3D scene or part of it from the set 10 of volumetric video contents of FIG. 9, according to a non-restrictive embodiment.

According to the embodiment of FIG. 10, an end-user is wearing an immersive rendering device 100 (e.g. an HMD) to browse into the video representation of the 3D scene. The position of the end-user is determined within the 3D scene (i.e. in the space of the 3D scene), for example using the IMU (Inertial Measurement Unit) of the HMD. The HMD may comprise one or more display screens (for example LCD (Liquid Crystal Display), OLED (Organic Light-Emitting Diode) or LCOS (Liquid Crystal On Silicon)) and sensor(s) configured for measuring the change(s) of position of the HMD, for example gyroscopes or an IMU (Inertial Measurement Unit), according to one, two or three axes of the real world (pitch, yaw and/or roll axis). The part of the volumetric content corresponding to the measured position of the HMD may be determined with a specific function establishing the relationship between the viewpoint associated with the HMD in the real world and the viewpoint of a virtual camera associated with the volumetric content. Controlling the part of the volumetric content to be displayed on the display screen(s) of the HMD according to the measured position of the HMD enables a user wearing the HMD to browse into the volumetric content (and the 3D scene), which is larger than the field of view associated with the display screen(s) of the HMD. According to a variant, the immersive rendering device 100 is a tablet with a tactile display screen, the user browsing into the content by scrolling the content with one or more fingers sliding onto the tactile display screen. According to another variant, the immersive rendering unit 100 is a control unit associated with a display device such as an HMD or a tablet.

An information representative of the current viewpoint of the end-user is transmitted, for example to a server or a remote storage device. The information representative of the viewpoint corresponds for example to the location of the immersive rendering device in the real world or the viewpoint of the immersive rendering device in the space of the 3D scene.

Based on the received information representative of the current viewpoint, a first volumetric video content 92 is selected among the set 10 of the volumetric video contents 70, 91, 92 and 73 stored on the server or remote storage device. The first volumetric video content 92 is determined by for example comparing the received current viewpoint with the spaces of view (or ranges of points of view) associated with each volumetric video content of the set 10. The received current viewpoint may for example be compared with a reference viewpoint (e.g. the central viewpoint) of each of the spaces of view of the volumetric video contents and the reference viewpoint that is spatially the closest from the received current viewpoint is selected, with the corresponding volumetric video content (e.g. the volumetric video content 92 and associated reference viewpoint X=2 according to the embodiment of FIGS. 9 and 10).

The first volumetric video content 92 is transmitted to the immersive rendering device 100. The data (texture and geometry) representative of the first volumetric video content 92 is for example encoded under the form of a set of first patches 92 arranged in pictures of patch atlas. At least a first patch 9021, 9022 refers to a second patch 7001, 7032 of a second volumetric video content 70, 73. The data transmitted and received by the immersive rendering device is decoded by a decoder 102. The data are obtained by decoding the information comprised in the first patches of the set 902 of patches. Some of the first patches of the set 902 comprise attributes associated with points of the 3D part of the 3D scene represented with the first volumetric video content 92. One or more first patches 9021, 9022 of the set 902 do not comprise attributes but merely an information indicating to which second patches or specific area of the second patches 7001, 7032 the first patches 9021, 9022 refer to.

The second volumetric video contents 70 and 73, which comprise the second patches 7001, 7032 the first patches 9021, 9022 may be transmitted with the first volumetric video content 92. According to a variant, only the second patches of the tiles that comprise the second patch 7001 and 7032 are transmitted, when the volumetric video contents of the set 10 are subdivided into tiles ((a tile corresponding to a sub area of the frame and is for example defined in HEVC standard (High Efficiency Video Coding) or in VP9 or AV1 of google with different acronym(s))), a part of the 3D scene being associated with each tile.

According to a variant, the second volumetric video contents 70 and 73 (or the tiles comprising the second patches the first patch refer to) are transmitted to the immersive rendering device 100 after transmission (by the immersive rendering device) of a request requesting the transmission of the second patches or associated second volumetric video contents 70, 73.

According to a further variant, the first patches referring to second patches of second volumetric video contents 70, 73 are not transmitted by the server to the immersive rendering device 100. According to this variant, the server may parse the first volumetric video content 92 or an associated mapping list (as the table 1 for example) to detect whether the first volumetric video content 92 comprises first patch(es) referring to second patch(es) of other volumetric video content(s) (called second volumetric video content(s)). When it is determined that the first volumetric video content 92 comprises one or more first patch(es) referring to one or more second patch(es), the server may automatically schedule the transmission of the first volumetric video content 92 (or tile(s) of the first volumetric video content 92) and second volumetric video contents 70, 73 (or tile(s) of the second volumetric video contents 70, 73) to the immersive rendering device 100.

According to a further variant, when the second volumetric video contents have already been received by the immersive rendering device (for example when synthesizing previous views of the scene corresponding to viewpoints of the second volumetric video contents 70, 73), the second volumetric video contents are not transmitted again and the immersive rendering device 100 may retrieve the data from the second patches the first patches of the first volumetric video content 92 refer to.

According to another variant, to avoid latency issues and delay in synthesizing the views, the future viewpoint following the current viewpoint may be determined by the immersive rendering device 100 or the server comprising the set of volumetric video contents (for example from the previous viewpoints by determined the displacement trajectory of the viewpoints within the 3D scene). The first and potential second volumetric video contents may be automatically transmitted in advance to the immersive rendering device that may decide to synthesize the view if the viewpoint of the end-user really corresponds to the one determined in advance.

A view of the 3D scene corresponding to the current viewpoint is synthesized, for example by a synthesizer 103, from the decoded data obtained from the first and second patches (by deprojecting the patches or by applying the operation inverse to the operation done for obtaining the 2D parametrization) and rendered in the end-user viewport. The synthesised view is transmitted to the display screen of the immersive rendering device (or to the display screen connected to the immersive rendering device) for display.

When a change of viewpoint of the end-user occurs, an information representative of the new viewpoint is transmitted, and the operations described hereinabove are reiterated.

The rendering of a given volumetric video content received from the server by the immersive rendering device corresponds to a 3DoF+ rendering of the part of the scene associated with the given volumetric video content. The consecutive rendering of several volumetric video contents of the set 8 enables a 6DoF rendering of the 3D scene (or part of it) while limiting the bitrate that is needed to stream the data representative of the volumetric video content for 6DoF rendering (only one volumetric video content representing a part of the 3D scene needs to be streamed at a time and not the whole 3D scene).

Figure 6:
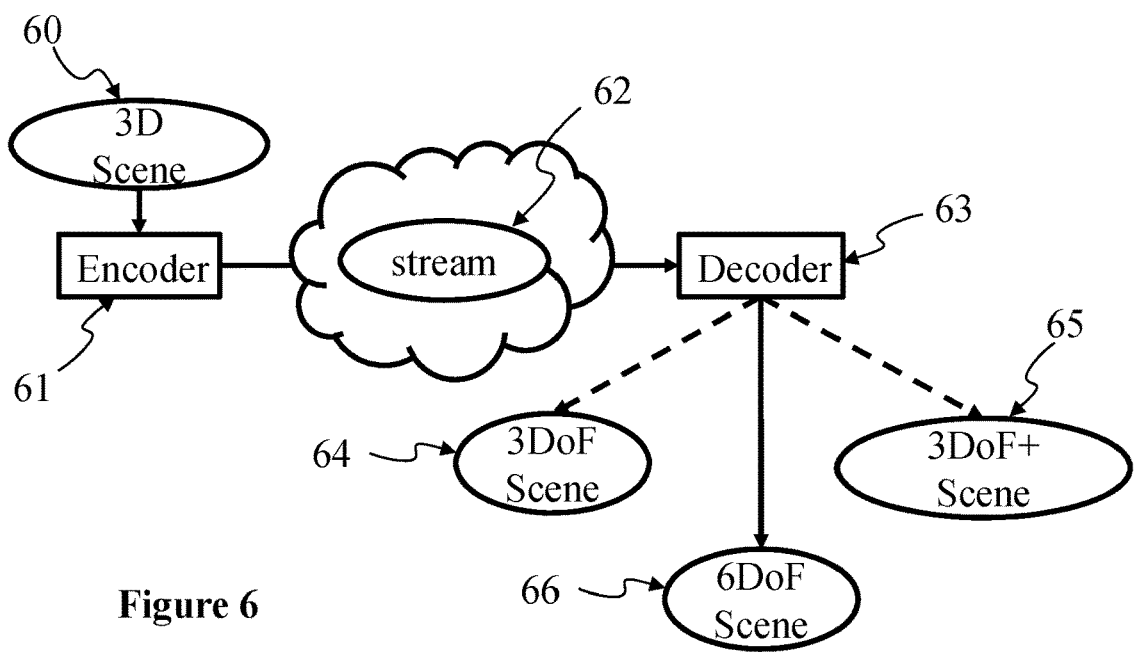
FIG. 6 shows an example of the encoding, transmission, reception and decoding of data representative of the 3D scene, according to a non-restrictive embodiment.

FIG. 6 shows a non-limitative example of the encoding, transmission, decoding and rendering of data representative of a 3D scene in a format that may be, at the same time, compatible for 3DoF, 3DoF+ and 6DoF rendering.

A picture or patch atlas of a 3D scene 60 (or a sequence of pictures of the 3D scene) is encoded in a stream 62 by an encoder 61. The stream 62 comprises a first element of syntax carrying data representative of a 3D scene for a 3DoF rendering (data of the first part of the picture 30 for example) and at least a second element of syntax carrying data representative of the 3D scene for 3DoF+ rendering (e.g. data of the second parts of the picture 30 and picture 40 or patch atlas 54, 55). The encoder may encode several pictures or patch atlas corresponding to various viewpoints (and associated space of view) of the scene (each corresponding to a volumetric video content as described in relation to FIGS. 7 to 10).

The encoder 61 is for example compliant with an encoder such as:
  JPEG, specification ISO/CEI 10918-1 UIT-T Recommendation T.81, https://www.itu.int/rec/T-REC-T.81/en;
  AVC, also named MPEG-4 AVC or h264. Specified in both UIT-T H.264 and ISO/CEI MPEG-4 Part 10 (ISO/CEI 14496-10), http://www.itu.int/rec/T-REC-H.264/en,HEVC (its specification is found at the ITU website, T recommendation, H series, h265, http://www.itu.int/rec/T-REC-H.265-201612-I/en);
  3D-HEVC (an extension of HEVC whose specification is found at the ITU website, T recommendation, H series, h265, http://www.itu.int/rec/T-REC-H.265-201612-I/en annex G and I);
  VP9 developed by Google; or
  AV1 (AOMedia Video 1) developed by Alliance for Open Media.

A decoder 63 obtains the stream 62 from a source. For example, the source belongs to a set comprising:
  a local memory, e.g. a video memory or a RAM (or Random-Access Memory), a flash memory, a ROM (or Read Only Memory), a hard disk;
  a storage interface, e.g. an interface with a mass storage, a RAM, a flash memory, a ROM, an optical disc or a magnetic support;
  a communication interface, e.g. a wireline interface (for example a bus interface, a wide area network interface, a local area network interface) or a wireless interface (such as a IEEE 802.11 interface or a Bluetooth® interface); and
  a user interface such as a Graphical User Interface enabling a user to input data.

The decoder 63 decodes the first element of syntax of the stream 62 for 3DoF rendering 64. For 3DoF+ rendering 65, the decoder decodes both the first element of syntax and the second element of syntax of the stream 62. For 6DoF rendering, the decoder decodes first element of syntax and the second element of syntax corresponding to several volumetric video contents.

The decoder 63 is compliant with the encoder 61, for example compliant with a decoder such as:
  JPEG;
  AVC;
  HEVC;
  3D-HEVC (an extension of HEVC);
  VP9; or
  AV1.

Figure 11:
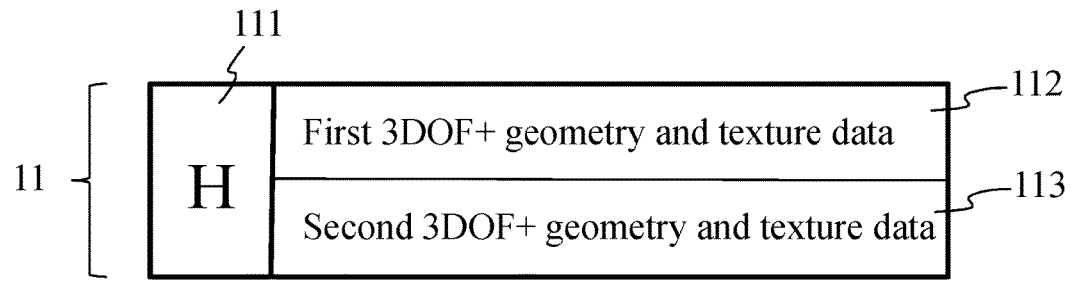
FIG. 11 shows an example of the syntax of a bitstream carrying data representative of at least a part of the volumetric video content of FIG. 7 or 9, according to a non-restrictive embodiment.

FIG. 11 shows a non-limiting example of an embodiment of the syntax of a stream carrying the data representative of the 3D scene when the data are transmitted over a packet-based transmission protocol. FIG. 11 shows an example structure 11 of a video stream. The structure consists in a container which organizes the stream in independent elements of syntax. The structure may comprise a header part 111, which is a set of data common to every syntax elements of the stream. For example, the header part comprises metadata about syntax elements, describing the nature and the role of each of them. The header part may also comprise the coordinates of the viewpoint used for the encoding of the picture 30, 40 (or patch atlas 54, 55) and information about the size and the resolution of the picture. The structure comprises a payload comprising a first element of syntax 112 and at least one second element of syntax 113. The first syntax element 112 may comprise data representative of a first volumetric video content and the one or more second syntax elements 113 may comprise data representative of one or more second volumetric video contents.

For illustration purpose, in the context of ISOBMFF file format standard, texture patches, geometry patches and the metadata would typically be referenced in ISOBMFF tracks in a box of type moov, with the texture data and geometry data themselves embedded in media-data box of type mdat.

Figure 12:
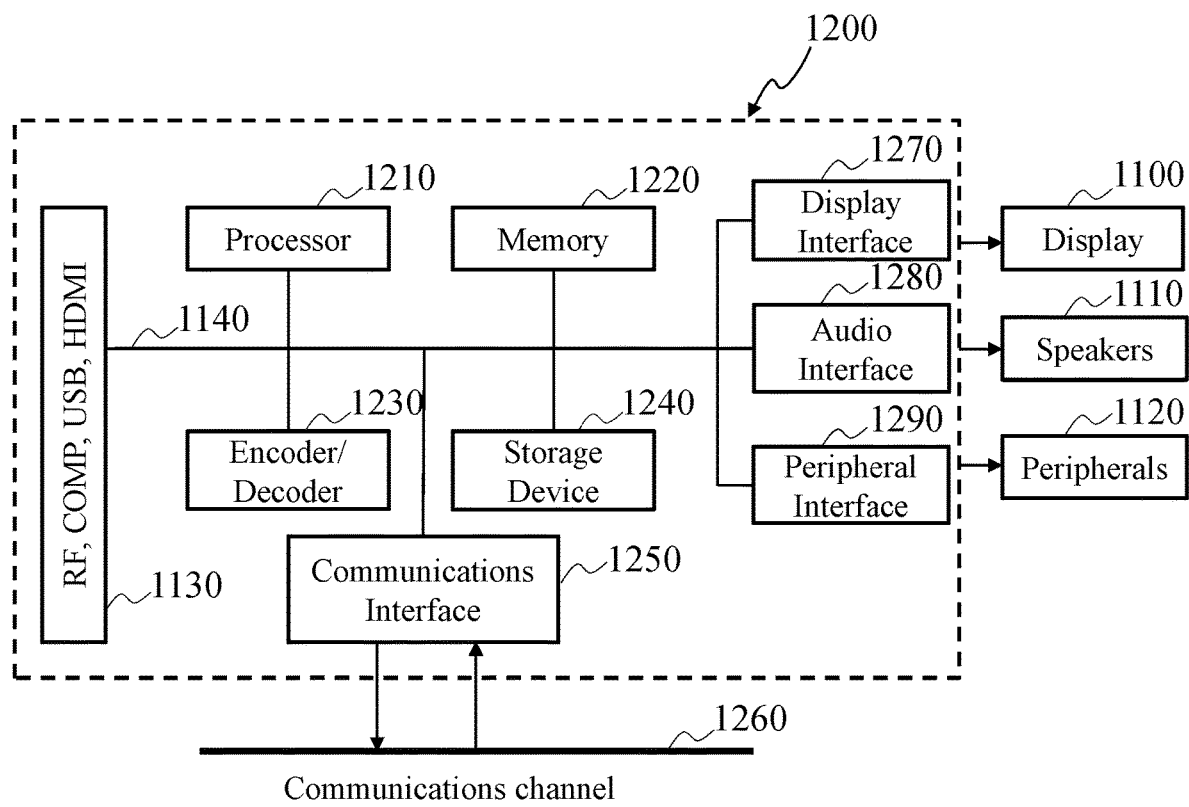
FIG. 12 shows an example architecture of a device which may be configured to implement a method or process described in relation with FIGS. 7, 8, 9, 10, 13 and/or 14, according to a non-restrictive embodiment.

FIG. 12 illustrates a block diagram of an example of a system in which various aspects and embodiments are implemented. System 1200 can be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1200, singly or in combination, can be embodied in a single integrated circuit, multiple ICs, and/or discrete components. For example, in at least one embodiment, the processing and encoder/decoder elements of system 1200 are distributed across multiple ICs and/or discrete components. In various embodiments, the system 1200 is communicatively coupled to other similar systems, or to other electronic devices, via, for example, a communications bus or through dedicated input and/or output ports. In various embodiments, the system 1200 is configured to implement one or more of the aspects described in this document.

The system 1200 includes at least one processor 1210 configured to execute instructions loaded therein for implementing, for example, the various aspects described in this document. Processor 1210 can include embedded memory, input output interface, and various other circuitries as known in the art. The system 1200 includes at least one memory 1220 (e.g., a volatile memory device, and/or a non-volatile memory device). System 1200 includes a storage device 1240, which can include non-volatile memory and/or volatile memory, including, but not limited to, EEPROM, ROM, PROM, RAM, DRAM, SRAM, flash, magnetic disk drive, and/or optical disk drive. The storage device 1240 can include an internal storage device, an attached storage device, and/or a network accessible storage device, as non-limiting examples.

System 1200 includes an encoder/decoder module 1230 configured, for example, to process data to provide an encoded video or decoded video, and the encoder/decoder module 1230 can include its own processor and memory. The encoder/decoder module 1230 represents module(s) that can be included in a device to perform the encoding and/or decoding functions. As is known, a device can include one or both of the encoding and decoding modules. Additionally, encoder/decoder module 1230 can be implemented as a separate element of system 1200 or can be incorporated within processor 1210 as a combination of hardware and software as known to those skilled in the art.

Program code to be loaded onto processor 1210 or encoder/decoder 1230 to perform the various aspects described in this document can be stored in storage device 1240 and subsequently loaded onto memory 1220 for execution by processor 1210. In accordance with various embodiments, one or more of processor 1210, memory 1220, storage device 1240, and encoder/decoder module 1230 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In several embodiments, memory inside of the processor 1210 and/or the encoder/decoder module 1230 is used to store instructions and to provide working memory for processing that is needed during encoding or decoding.

In other embodiments, however, a memory external to the processing device (for example, the processing device can be either the processor 1210 or the encoder/decoder module 1230) is used for one or more of these functions. The external memory can be the memory 1220 and/or the storage device 1240, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC (Versatile Video Coding).

The input to the elements of system 1200 can be provided through various input devices as indicated in block 1130. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1130 have associated respective input processing elements as known in the art. For example, the RF portion can be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband.

In one set-top box embodiment, the RF portion and its associated input processing element receives an RF signal transmitted over a wired (for example, cable) medium, and performs frequency selection by filtering, down-converting, and filtering again to a desired frequency band.

Various embodiments rearrange the order of the above-described (and other) elements, remove some of these elements, and/or add other elements performing similar or different functions.

Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1200 to other electronic devices across USB and/or HDMI connections. It is to be understood that various aspects of input processing, for example, Reed-Solomon error correction, can be implemented, for example, within a separate input processing IC or within processor 1210 as necessary. Similarly, aspects of USB or HDMI interface processing can be implemented within separate interface ICs or within processor 1210 as necessary. The demodulated, error corrected, and demultiplexed stream is provided to various processing elements, including, for example, processor 1210, and encoder/decoder 1230 operating in combination with the memory and storage elements to process the data stream as necessary for presentation on an output device.

Various elements of system 1200 can be provided within an integrated housing. Within the integrated housing, the various elements can be interconnected and transmit data therebetween using suitable connection arrangement, for example, an internal bus as known in the art, including the I2C bus, wiring, and printed circuit boards.

The system 1200 includes communication interface 1250 that enables communication with other devices via communication channel 1260. The communication interface 1250 can include, but is not limited to, a transceiver configured to transmit and to receive data over communication channel 1260. The communication interface 1250 can include, but is not limited to, a modem or network card and the communication channel 1260 can be implemented, for example, within a wired and/or a wireless medium.

Data is streamed to the system 1200, in various embodiments, using a Wi-Fi network such as IEEE 802.11. The Wi-Fi signal of these embodiments is received over the communications channel 1260 and the communications interface 1250 which are adapted for Wi-Fi communications. The communications channel 1260 of these embodiments is typically connected to an access point or router that provides access to outside networks including the Internet for allowing streaming applications and other over-the-top communications.

Other embodiments provide streamed data to the system 1200 using a set-top box that delivers the data over the HDMI connection of the input block 1130.

Still other embodiments provide streamed data to the system 1200 using the RF connection of the input block 1130.

The system 1200 can provide an output signal to various output devices, including a display 1100, speakers 1110, and other peripheral devices 1120. The other peripheral devices 1120 include, in various examples of embodiments, one or more of a stand-alone DVR, a disk player, a stereo system, a lighting system, and other devices that provide a function based on the output of the system 1200.

In various embodiments, control signals are communicated between the system 1200 and the display 1100, speakers 1110, or other peripheral devices 1120 using signaling such as AV.Link, CEC, or other communications protocols that enable device-to-device control with or without user intervention.

The output devices can be communicatively coupled to system 1200 via dedicated connections through respective interfaces 1270, 1280, and 1290.

Alternatively, the output devices can be connected to system 1200 using the communications channel 1260 via the communications interface 1250. The display 1100 and speakers 1110 can be integrated in a single unit with the other components of system 1200 in an electronic device such as, for example, a television.

In various embodiments, the display interface 1270 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

Figure 13:
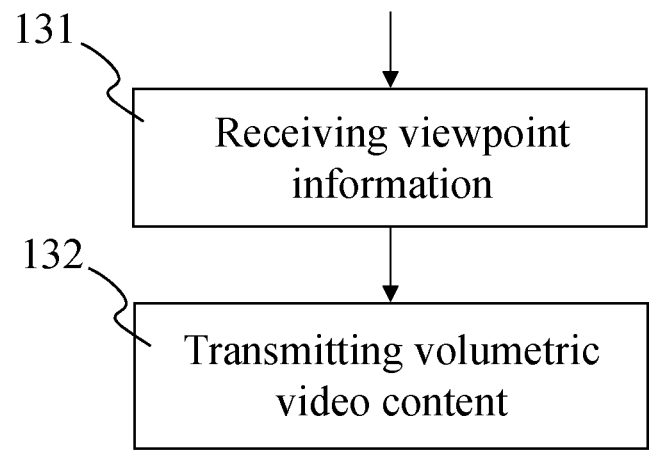
FIG. 13 shows an example of a method for transmitting data representative of a volumetric video content representative of at least a part of the 3D scene of FIG. 1, implemented for example in the device of FIG. 12, according to a non-restrictive embodiment.

FIG. 13 illustrates a method for transmitting data representative of a 3D scene, for example the 3D scene 10, according to a non-restrictive embodiment. The method may for example be implemented in the encoder 61 and/or in the device 1200. The different parameters of the device 1200 may be updated. The 3D scene may for example be obtained from a source, one or more points of view may be determined in the space of the 3D scene, parameters associated with projection mapping(s) may be initialized.

In a first operation 131, an information representative of a viewpoint in the 3D scene is received. The 3D scene is represented with a set of volumetric video contents, a space of view or range of points of view being associated with each volumetric video content.

In a second operation 132, data representative of a first volumetric video content of the set of volumetric video contents is transmitted. The first volumetric video content is according to a range of points of view that comprises the viewpoint. The first volumetric video content is represented with a set of first patches, each first patch of the set corresponding to a two-dimensional parametrization of a first group of points comprised into the 3D part of the 3D scene associated with the first volumetric video content. At least a first patch of the set of first patches refers to a second patch (or an area of the second patch), the second patch corresponding to a two-dimensional parametrization of a second group of points comprised into another 3D part of the 3D scene associated with a second volumetric video content of the set of volumetric video contents. The second volumetric video content is different from the first volumetric video content, the range of points of view of the first volumetric video content being different from range of points of view of the second volumetric video content, even if they may partially overlap each other.

According to a specific embodiment, the second patch(es) to which the one or more first patches refer to is (are) transmitted with the first patches. According to a variant embodiment, the second patches have already been transmitted in a previous operation and stored in a memory of the device 1200.

According to a further specific embodiment, the second patch(es) is (are) transmitted upon reception of a request requesting the transmission of the second patch(es).

According to another specific embodiment, attributes (e.g. texture and/or geometry/depth) associated with the points of the at least a first group of points associated with the at least a first patch referring to the at least a second patch are comprised in the at least a second patch. The at least a first patch comprises an information identifying the at least a second patch (or the area of the at least a second patch).

According to a further embodiment, attributes associated with the points of the at least a first group of points associated with the at least a first patch referring to the at least a second patch are comprised in the at least a second patch. A mapping information representative of the referring of the at least a first patch to the at least a second patch is associated with the first volumetric video content. The mapping information may for example be comprised in a table associated with the first volumetric content.

Figure 14:
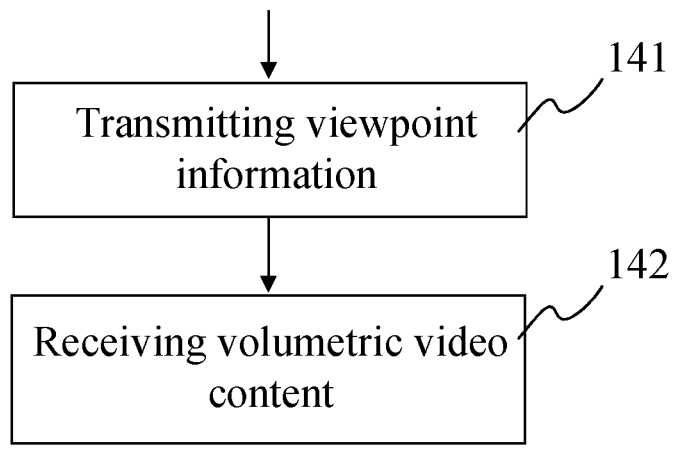
FIG. 14 shows an example of a method for receiving data representative of a volumetric video content representative of at least a part of the 3D scene of FIG. 1, implemented for example in the device of FIG. 12, according to a non-restrictive embodiment.

FIG. 14 illustrates a method for receiving data representative of a 3D scene, for example the 3D scene 10, according to a non-restrictive embodiment. The method may for example be implemented in the decoder 63 and/or in the immersive rendering device 100 and/or in the device 1200. The different parameters of the device 1200 may be updated. The data may for example be obtained from a source, e.g. a memory of a bitstream.

In a first operation 141, an information representative of a viewpoint in the 3D scene is transmitted. The 3D scene is represented with a set of volumetric video contents, a space of view or range of points of view being associated with each volumetric video content.

In a second operation 142, data representative of a first volumetric video content of the set of volumetric video contents is received, for example from a bitstream or a local memory or a remote memory device. The first volumetric video content is according to a range of points of view that comprises the viewpoint. The first volumetric video content is represented with a set of first patches, each first patch of the set corresponding to a two-dimensional parametrization of a first group of points comprised into the 3D part of the 3D scene associated with the first volumetric video content. At least a first patch of the set of first patches refers to a second patch (or an area of the second patch), the second patch corresponding to a two-dimensional parametrization of a second group of points comprised into another 3D part of the 3D scene associated with a second volumetric video content of the set of volumetric video contents. The second volumetric video content is different from the first volumetric video content, the range of points of view of the first volumetric video content being different from range of points of view of the second volumetric video content, even if they may partially overlap each other.

According to a specific embodiment, the second patch(es) to which the one or more first patches refer to is (are) received with the first patches. According to a variant embodiment, the second patches have already been received in a previous operation and are retrieved from a storage unit (e.g. a memory of the device 1200).

According to a further specific embodiment, a request requesting the transmission of the second patch(es) is transmitted.

According to another specific embodiment, attributes (e.g. texture and/or geometry/depth) associated with the points of the at least a first group of points associated with the at least a first patch referring to the at least a second patch are comprised in the at least a second patch. The at least a first patch comprises an information identifying the at least a second patch (or the area of the at least a second patch).

According to a further embodiment, attributes associated with the points of the at least a first group of points associated with the at least a first patch referring to the at least a second patch are comprised in the at least a second patch. A mapping information representative of the referring of the at least a first patch to the at least a second patch is associated with the first volumetric video content. The mapping information may for example be comprised in a table associated with the first volumetric content.

According to an optional embodiment, one or more views of the scene are rendered from the received data. The rendered view(s) may be transmitted for display.

Naturally, the present document is not limited to the embodiments previously described.

In particular, the present document is not limited to a method and device for transmitting/receiving data representative of a 3D scene but also extends to a method for encoding/decoding the data and/or a method for generating a bitstream comprising the encoded data and to any device implementing this method and notably any devices comprising at least one CPU and/or at least one GPU.

The present document also relates to a method (and a device configured) for displaying images rendered from the decoded data of the bitstream.

The present document also relates to a method (and a device configured) for transmitting and/or receiving the bitstream.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
   receiving an information representative of a first viewpoint in a 3D scene, the 3D scene being represented with a set of volumetric video contents;
   each volumetric video content being determined according to a range of points of view and being represented with a set of patches, a patch of the set corresponding to a two-dimensional parametrization of a group of points comprised into a 3D part of the 3D scene associated with the volumetric video content; and
   transmitting a first volumetric video content of the set selected according to the first viewpoint, the range of points of view of the first volumetric video comprising the first viewpoint.

2. The method according to claim 1, wherein a second volumetric video content is transmitted upon reception of a second viewpoint different from the first viewpoint, the range of points of view of the second volumetric video comprising the second viewpoint.

3. The method according to claim 2, wherein the range of points of view of the first volumetric video content and the range of points of view of the second volumetric video content partially overlap.

4. The method according to claim 1, wherein at least a patch of the set of patches of the first volumetric video refers to at least an area of at least a second patch corresponding to a two-dimensional parametrization of a second group of points comprised into another 3D part of the 3D scene associated with a second volumetric video content of the set of volumetric video contents.

5. The method according to claim 4, wherein attributes associated with the points of the at least a first group of points associated with the at least a first patch referring to the at least an area of the at least a second patch are comprised in said at least an area of the at least a second patch, the at least a first patch comprising an information identifying the at least an area of the at least a second patch.

6. The method according to claim 4, wherein attributes associated with the points of the at least a first group of points associated with the at least a first patch referring to the at least an area of the at least a second patch are comprised in the at least a second patch, mapping information representative of the referring of the at least a first patch to the at least an area of the at least a second patch being associated with the first volumetric video content.

7. A device comprising:
   a receiver configured to receive an information representative of a first viewpoint in a 3D scene, the 3D scene being represented with a set of volumetric video contents; each volumetric video content being determined according to a range of points of view and being represented with a set of patches, a patch of the set corresponding to a two-dimensional parametrization of a group of points comprised into a 3D part of the 3D scene associated with the volumetric video content; and
   a transmitter configured to transmit a first volumetric video content of the set selected according to the first viewpoint, the range of points of view of the first volumetric video comprising the first viewpoint.

8. The device according to claim 7, wherein a second volumetric video content is transmitted upon reception of a second viewpoint different from the first viewpoint, the range of points of view of the second volumetric video comprising the second viewpoint.

9. The device according to claim 8, wherein the range of points of view of the first volumetric video content and the range of points of view of the second volumetric video content partially overlap.

10. The device according to claim 7, wherein at least a patch of the set of patches refers to at least an area of at least a second patch corresponding to a two-dimensional parametrization of a second group of points comprised into another 3D part of the 3D scene associated with a second volumetric video content of the set of volumetric video contents.

11. The device according to claim 10, wherein attributes associated with the points of the at least a first group of points associated with the at least a first patch referring to the at least an area of the at least a second patch are comprised in the at least an area of the at least a second patch, the at least a first patch comprising an information identifying the at least an area of the at least a second patch.

12. The device according to claim 10, wherein attributes associated with the points of the at least a first group of points associated with the at least a first patch referring to the at least an area of the at least a second patch are comprised in the at least a second patch, mapping information representative of the referring of the at least a first patch to the at least an area of the at least a second patch being associated with the first volumetric video content.

13. A method comprising:
transmitting an information representative of a first viewpoint in a 3D scene, the 3D scene being represented with a set of volumetric video contents; each volumetric video content being determined according to a range of points of view and being represented with a set of patches, a patch of the set corresponding to a two-dimensional parametrization of a group of points comprised into a 3D part of the 3D scene associated with the volumetric video content; and
receiving a first volumetric video content of the set selected according to the first viewpoint, the range of points of view of the first volumetric video comprising the first viewpoint.

14. The method according to claim 13, wherein a second volumetric video content is received after transmission of a second viewpoint different from the first viewpoint, the range of points of view of the second volumetric video comprising the second viewpoint.

15. The method according to claim 13, wherein at least a patch of the set of patches refers to at least an area of at least a second patch corresponding to a two-dimensional parametrization of a second group of points comprised into another 3D part of the 3D scene associated with a second volumetric video content of the set of volumetric video contents.

16. The method according to claim 15, wherein attributes associated with the points of the at least a first group of points associated with the at least a first patch referring to the at least an area of the at least a second patch are comprised in the at least an area of the at least a second patch, the at least a first patch comprising an information identifying the at least an area of the at least a second patch.

17. The method according to claim 15, wherein attributes associated with the points of the at least a first group of points associated with the at least a first patch referring to the at least an area of the at least a second patch are comprised in the at least a second patch, mapping information representative of the referring of the at least a first patch to the at least an area of the at least a second patch being associated with the first volumetric video content.

18. A device comprising:
a transmitter configured to transmit an information representative of a first viewpoint in a 3D scene, the 3D scene being represented with a set of volumetric video contents; each volumetric video content being determined according to a range of points of view and being represented with a set of patches, a patch of the set corresponding to a two-dimensional parametrization of a group of points comprised into a 3D part of the 3D scene associated with the volumetric video content; and
a receiver configured to receive a first volumetric video content of the set selected according to the first viewpoint, the range of points of view if the first volumetric video comprising the first viewpoint.

19. The device according to claim 18, wherein a second volumetric video content is received after transmission of a second viewpoint different from the first viewpoint, the range of points of view of the second video volumetric content comprising the second viewpoint.

20. The device according to claim 18, wherein at least a patch of the set of patches refers to at least an area of at least a second patch corresponding to a two-dimensional parametrization of a second group of points comprised into another 3D part of the 3D scene associated with a second volumetric video content of the set of volumetric video contents.

21. The device according to claim 20, wherein attributes associated with the points of the at least a first group of points associated with the at least a first patch referring to the at least an area of the at least a second patch are comprised in the at least an area of the at least a second patch, the at least a first patch comprising an information identifying the at least an area of the at least a second patch.

22. The device according to claim 21, wherein attributes associated with the points of the at least a first group of points associated with the at least a first patch referring to the at least an area of the at least a second patch are comprised in the at least a second patch, mapping information representative of the referring of the at least a first patch to the at least an area of the at least a second patch being associated with the first volumetric video content.

* * * * *